UNITED STATES PATENT OFFICE.

MATTHEW HENRY DEVEY, OF PHILADELPHIA, PENNSYLVANIA.

SUBMARINE PRESERVING AND ANTIFOULING COMPOSITION.

SPECIFICATION forming part of Letters Patent No. 754,054, dated March 8, 1904.

Application filed December 5, 1901. Renewed January 11, 1904. Serial No. 188,666. (No specimens.)

*To all whom it may concern:*

Be it known that I, MATTHEW HENRY DEVEY, a citizen of the United States, residing at Philadelphia, in the county of Philadelphia and State of Pennsylvania, have invented certain new and useful Improvements in Submarine Preserving and Antifouling Compositions, of which the following is a specification.

My invention relates to a compound to be used to coat the wooden or metal bottoms of ships to preserve them from decay or rust and also prevent the fouling of said bottoms by barnacles, and has for its object to provide a composition that will readily adhere to a wooden, metal, or other surface and successfully resist the action of water, thus not only protecting the bottom of the ship from disintegration, but also making the bottom watertight, filling all crevices that might have been overlooked in calking the bottom.

It of course is understood that my invention is equally applicable to piles, caissons, and other submerged structures, as well as pipes and subterranean conduits.

My invention consists of the following ingredients and mixed in the manner stated: I take raw linseed-oil or its equivalent and boil it two and one-half hours. After the oil has boiled for one-half hour I put in three ounces of litharge to every gallon of raw oil being treated, stirring the mixture constantly to prevent the litharge settling to the bottom of the pot. After the mixture of oil and litharge has boiled for one hour or one and one-half hours after the oil has commenced to boil I introduce six pounds of finely-ground sulfate of copper dissolved in linseed-oil to each gallon of raw linseed-oil. I am aware that sulfate of copper is more easily dissolved in spirits of turpentine; but to insure a smooth surface to my compound when applied to the surface to be protected I prefer to not introduce the spirits of turpentine, hence dissolve the sulfate of copper in linseed-oil. After the oil has boiled the two and one-half hours required I draw the fire and stir into the mixture below boiling-point two pounds of Venice turpentine to each original gallon of oil. The other ingredients in my compound are Portland cement and finely-ground glass in equal proportions, the glass being of equal parts of each of four sizes—viz., finely-bolted and that run through a twenty-four-mesh sieve, a twenty-six-mesh sieve, and a twenty-eight-mesh sieve. I take of Portland cement twenty pounds and the ground glass twenty pounds, five pounds of each of the four sizes to each gallon of linseed-oil originally used. The cement is first stirred into the mixture of oil, litharge, sulfate of copper, and Venice turpentine, and then the glass is introduced, beginning with the coarsest grade or that run through a twenty-four-mesh sieve and ending with the finest or bolted. When the mixture is of the consistency desired, it is applied to the part to be covered while still hot and worked until a smooth surface to the compound is secured.

This compound will prevent barnacles attaching themselves to the vessel's bottom because of the presence of the sulfate of copper, while by working the compound to a smooth surface the speed of the vessel is not retarded.

Having thus described my invention, what I claim is—

1. A compound consisting of boiled linseed-oil, litharge, sulfate of copper, Venice turpentine, Portland cement, and ground glass, substantially as and for the purpose described.

2. A compound consisting of one gallon of boiled linseed-oil, three ounces of litharge, six pounds of sulfate of copper, two pounds of Venice turpentine, twenty pounds of Portland cement, and twenty pounds of ground glass, substantially as and for the purpose described.

3. A compound for coating submarine structures consisting of one gallon of boiled linseed-oil, three ounces of litharge, six pounds of sulfate of copper, two pounds of Venice turpentine, twenty pounds of Portland cement, five pounds of ground glass bolted, five pounds of ground glass run through a twenty-four-mesh sieve, five pounds of ground glass run through a twenty-six-mesh sieve, and five pounds of ground glass run through a twenty-eight-mesh sieve, substantially as described.

In testimony whereof I hereto affix my signature in the presence of two witnesses.

MATTHEW HENRY DEVEY.

Witnesses:
HARRY DAVIS,
E. T. WEAVER.